United States Patent Office 3,130,426
Patented Apr. 28, 1964

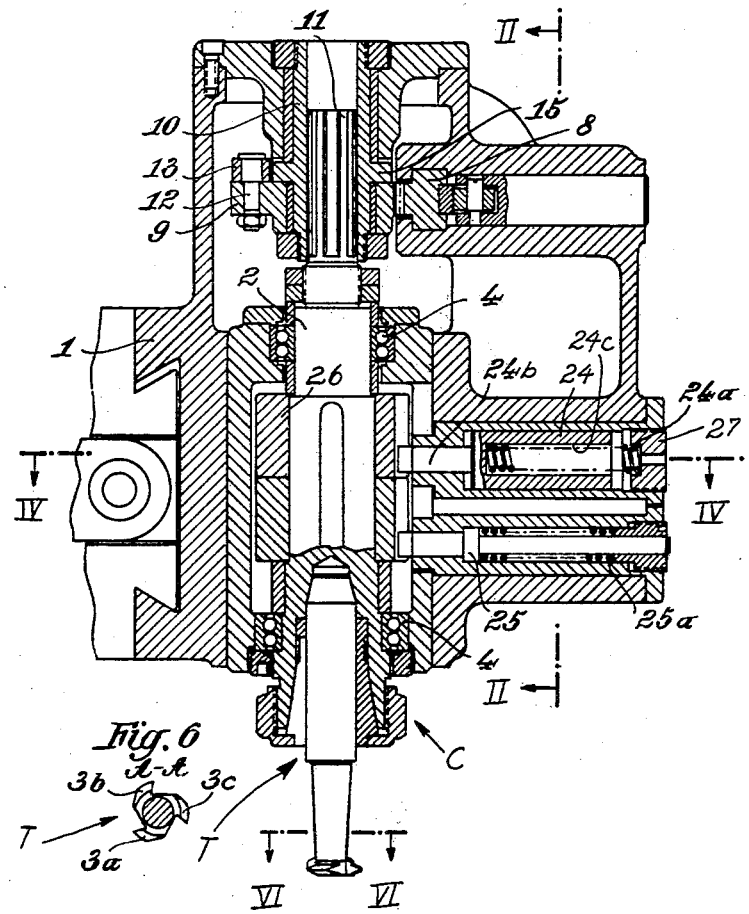

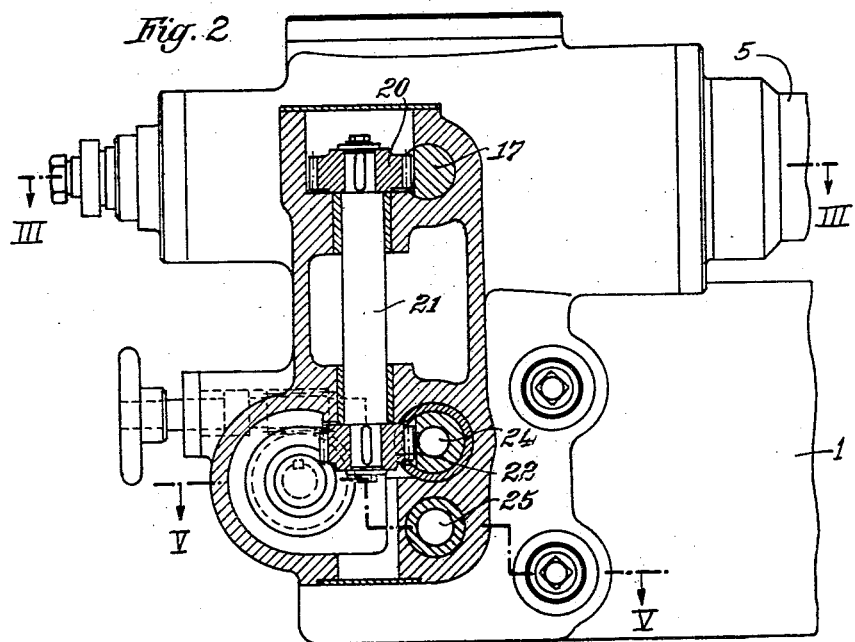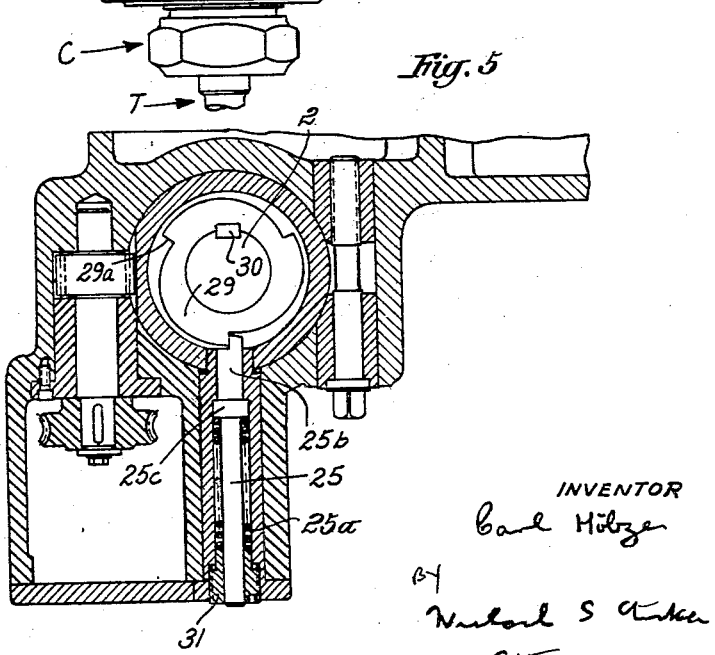

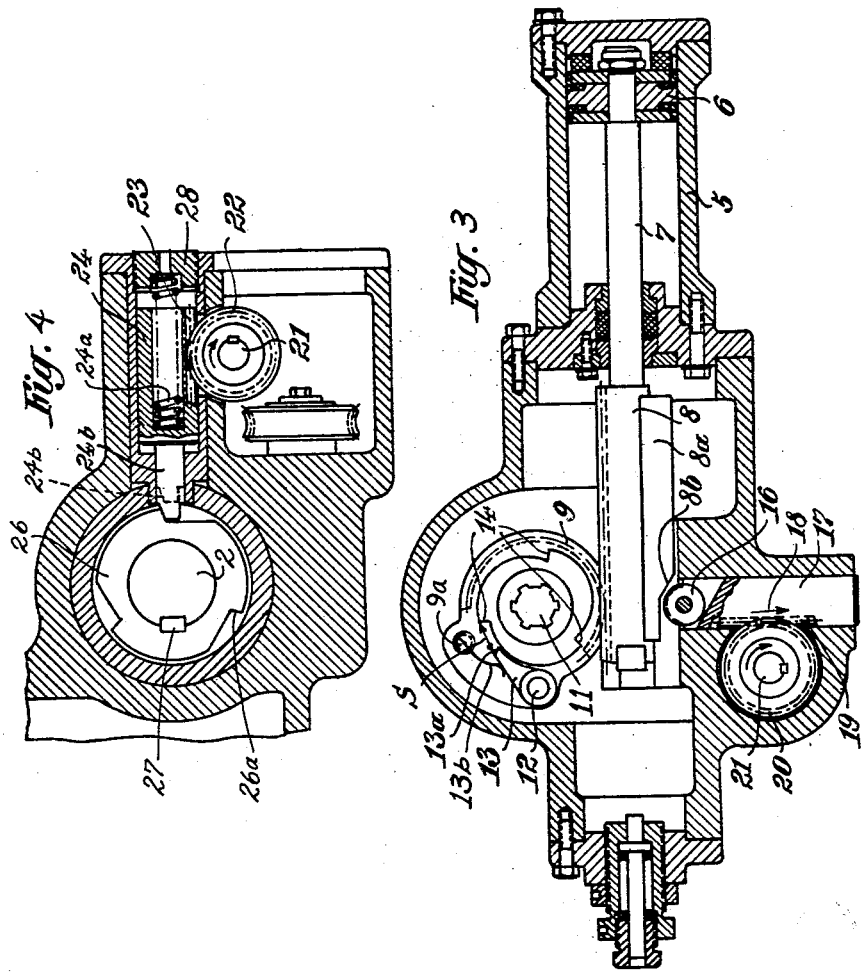

3,130,426
APPARATUS FOR ROTATING AND LOCKING HOLDERS FOR THREAD CUTTING TOOLS AND THE LIKE
Carl Hölzer, Solingen, Germany, assignor to Th. Kieserling & Albrecht, Solingen, Germany
Filed Aug. 10, 1959, Ser. No. 832,770
Claims priority, application Germany Aug. 19, 1958
6 Claims. (Cl. 10—101)

The present invention relates to an apparatus for intermittently rotating and locking an angularly movable member, such as the holder for a multi-knife thread cutting tool or the like, and more particularly to means for cutting threads on pipe sockets. The novel apparatus is particularly suitable for use in connection with thread cutting tools which comprise more than a single cutting member and in which the cutting members are radially disposed in a common plane.

It is already known to utilize for cutting of threads on pipe sockets and the like a so-called vertical thread cutting machine which is capable of performing the thread cutting operation in a series of consecutive steps. The workpieces are placed by hand into a revolving disk or tray to be thereupon automatically advanced to the various treating or thread cutting stations by rotating the disc through angles of pre-determined magnitude. In the first step, a work piece, such as a pipe socket, is formed with a bore and chamfered, whereupon the thread cutting operation is performed in a series of steps, for example, in ten consecutive stages. The holder for the thread cutting means is moved into required positions by a system of cams or the like.

In order to increase the efficiency of such prior thread cutting apparatus, proposals were already made to provide a series of superimposed cutting blades on a common holder which, upon movements of the vertically mounted holder in downward direction, are consecutively moved into actual engagement with a workpiece.

A serious disadvantage of such presently utilized thread cutting devices is that a group of knives mounted on a common carrier or holder can be utilized only for the formation of threads with a given pitch and that, therefore, the thread cutting tool must be exchanged at frequent intervals for reasons other than due to actual damage or wear and tear. In addition, all knives are put to actual use to the same extent during each thread cutting operation whereby the knife which imparts to a newly formed thread its final shape, too, rapidly loses its accurate profile because of excessive wear and tear. Consequently, the quality of threads formed by such an assembly does not meet the standards of perfection, i.e. the dimensions and configuration of threads are not within the prescribed tolerances. Moreover, the stroke performed by a holder carrying a series of longitudinally spaced thread cutting members is exceedingly long because each individual knife, i.e. also the one which imparts to the thread its final shape, must be led all the way through a hollow pipe socket or the like. Such arrangement renders necessary the provision of long cylinders, the use of considerable quantities of a pressure fluid, and high energy consumption for reciprocating the holder.

An important object of the present invention is to provide an apparatus for intermittently rotating and releasably locking an angularly movable member into a series of angularly spaced positions.

Another object of the invention is to provide an apparatus for rotatably holding for intermittently moving, and for releasably locking a holder for thread cutting tools and the like which is capable of accurately and rapidly moving any selected knife of a thread cutting tool into operative position.

A further object of the invention is to provide an apparatus for cutting threads and the like which insures that the threads satisfy the requirements as to tolerances even if one, two or more of a series of cutting members should become worn after long periods of actual use.

A concomitant object of the invention is to provide an apparatus for angularly moving and securely arresting a rotatable holder for tools and the like in a number of angularly spaced positions by utilizing a comparatively short cylinder and very simple motion transmitting and arresting means.

With the above objects in view, the invention resides essentially in the provision of a housing rotatably mounting a holder or carrier for a thread cutting or other tool, for example, a thread cutting tool having two or more spaced knives disposed in a common plane, the knives being intermittently moved by the holder into operative position, i.e. into actual cutting engagement with a workpiece. In this manner, the knife which imparts to a newly formed thread its final shape is subjected to much less wear and tear because the other knives may be used beyond the normally permissible limits of wear and tear while the first mentioned or fine cutter is called for solely to remove comparatively small quantities of material in order to impart to the thread its desirable final configuration. Thus, even if the knives first to come into contact with a workpiece have already lost their fine profiles, the quality of threads cut or formed thereby is not affected because the less-worn fine cutter corrects whatever irregularities might exist in the thread due to the latter's previous contact with worn-out cutting members.

The means for bringing about rotation of the tool holder preferably comprises a double acting cylinder and piston assembly which transmits rotation to the holder through a linearly movable gear rack, through a gear which is in constant mesh with the rack, and through a ratchet and pawl assembly, the number of teeth on the ratchet wheel corresponding to the number of radially arranged knives carried by the holder and to the number of desired angular positions to be assumed by the holder. For example, if the holder supports a thread cutting tool comprising three knives, the ratchet wheel is formed with three teeth and the stroke of the aforementioned gear rack is so selected that it rotates the holder through 120 degrees during each forward stroke of the piston.

The novel apparatus further comprises means for safely locking the holder against angular movements in both directions whenever one of the knives is put to actual use. The locking means preferably comprises two slidable bolts which cooperate with oppositely inclined teeth of two ratchet wheels fixed to the holder and which are constantly biased into locking engagement with the respective ratchet teeth by a pair of expansion springs or the like.

One of the locking bolts must be released whenever the holder is to be rotated through a given angle (say 120 degrees) in order to move a different knife into operative thread-cutting position. This may be brought about by providing an operative connection between the gear rack and the one locking bolt so that the latter permits angular movements of the holder through a selected angle when the rack performs its forward stroke. Since the release of the one locking bolt must be brought about before the rotation of the holder begins, the initial portion of the stroke performed by the gear rack does not affect the aforementioned ratchet and pawl assembly which becomes active and actually rotates the holder only during the subsequent portion of the stroke performed by the rack.

The novel features which are considered as characteristic of the invention are set forth in particular in the appended claims. The invention itself, however, both as to its construction and its method of operation, together with additional objects and advantages thereof, will be best understood from the following description of a specific embodiment when read in connection with the accompanying drawings, in which:

FIG. 1 is vertical section through the housing of the holder for a thread cutting tool showing the mechanisms for rotating and locking the holder;

FIG. 2 is a vertical section taken on the line II—II of FIG. 1, as seen in the direction of arrows, showing in greater detail the means for actuating the locking mechanism for the holder;

FIG. 3 is a horizontal section taken on the line III—III of FIG. 2, as seen in the direction of arrows, showing the means which actuates the mechanism for rotating the holder for the thread cutting tool;

FIG. 4 is a horizontal section taken on the line IV—IV of FIG. 1, as seen in the direction of arrows, showing the operative position of one locking or arresting bolt in full lines and the idle position of the locking bolt in broken lines;

FIG. 5 is a horizontal section taken on the line V—V of FIG. 2, as seen in the direction of arrows, showing a second locking bolt which prevents return movements of the tool holder; and FIG. 6 is a section taken on the line VI—VI of FIG. 1, as seen in the direction of arrows, showing in plan view a thread cutting tool consisting of three knives which are spaced through 120 degrees from each other.

Referring now in greater detail to the illustrated embodiment, and first to FIG. 1, the apparatus comprises a housing or casing 1 for the holder 2 of a thread cutting tool T. The means for mounting the housing 1 on the bed of a machine tool for reciprocatory movements in vertical and horizontal directions forms no part of this invention and is not illustrated in the drawings. The thread cutting tool T, which is removably held in a chuck C carried by the lower end of holder 2, comprises three coplanar knives or cutters 3a, 3b, 3c, best shown in FIG. 6. After drilling and chamfering of a non-represented workpiece, e.g. a socket pipe, the workpiece is subjected to consecutive thread cutting actions of knives 3a, 3b, 3c.

For moving the knives 3a–3c into thread cutting position, i.e. into contact with the workpiece, the holder 2 must be intermittently or stepwise rotated through 120 degrees with respect to its housing 1. To that end, the holder 2 is mounted in two spaced antifriction bearings 4 and is rotated by a mechanism best shown in FIGS. 1 and 3. The latter illustration shows a cylinder 5 reciprocably receiving a double acting piston or plunger 6 whose rod 7 is disposed at right angles to the axis of holder 2. The piston rod 7 is connected to a toothed rack 8 whose teeth mesh with the teeth of a pinion or gear 9. The gear 9 is rotatably mounted on a sleeve or bushing 10 which is coaxial with and surrounds the upper end 11 of the tool holder 2. The end 11 of the holder 2 is splined (see FIG. 3) and is non-rotatably received in the correspondingly shaped bore of sleeve 10, i.e. the members 2 and 10 always rotate in unison. The straight-line movements of toothed rack 8 are transformed into intermittent or stepwise angular movements of holder 2 by means of a pawl 13 which is rotatably mounted on the gear 9 by a bolt 12. The nose or pallet 13a of pawl 13 is adapted to abut against a selected tooth 14 of the ratchet wheel 15 upon slight angular movements of gear 9 under the influence of gear rack 8. The pallet 13a of pawl 13 is constantly biased in a direction toward the ratchet wheel 15 by a leaf spring 13b which is anchored in a stud 9a carried by the gear 9. The stroke of piston 6 is so selected that the rack 8, upon reaching its left-hand end position, causes the gear 9 and pawl 13 to turn the ratchet wheel 15 and the members 2, 10 through exactly 120 degrees. As can be seen in FIG. 1, the ratchet wheel 15 is integrally formed with sleeve 10 and thus moves a selected knife or cutter into operative position when the plunger 6 completes its stroke into its second end position in the direction to the left as viewed in FIG. 3.

The holder 2 must be safely locked whenever one of the cutters 3a–3c is moved into operative position into thread cutting contact with a workpiece. However, in order to enable the pawl 13 to turn the holder 2 whenever the plunger 6 performs its forward stroke, the locking or arresting means must be withdrawn or disengaged before the pallet 13a of the pawl 13 comes into actual abutment with one of the teeth 14 on the ratchet wheel 15. As will be noted in FIG. 3, there is a clearance or space S between the end of the pallet 13a and the nearest tooth or shoulder 14 on the ratchet wheel 15. While the pawl 13 moves its pallet toward the nearest tooth 14, the advancing rack 8 disconnects or disengages the locking means so that the holder 2 with the thread cutting tool T is unlocked when the pallet 13a comes into actual contact with a tooth 14 and begins to rotate the ratchet wheel 15. Thus, when the rack 8 is in the position of FIG. 3, the pallet 13a is spaced from the nearest tooth 14, and the initial portion of the forward stroke of piston 6 and rack 8 in a direction to the left of FIG. 3 brings about the movement of pallet 13a into engagement with the nearest member 14 and simultaneously unlocks the mechanism which normally retains the holder 2 against angular movements in one direction whenever one of the cutters 3a–3c is in actual use. The rack 8 carries an extension or projection 8a (see FIG. 3) which is formed with an inclined cam surface 8b. When the rack 8 begins its forward stroke, the cam surface 8b engages a follower roller 16 which is rotatably mounted on a push rod or ram 17, whereby the latter is caused to perform an axial movement in the direction of arrow 18. The teeth 19 at one side of member 17 constantly mesh with the teeth of a pinion 20 which is mounted on a shaft 21. The pinion 20 and its shaft 21 are thus caused to rotate in clockwise direction when the toothed ram 17 advances in the direction of arrow 18.

As is best shown in FIGS. 2 and 4, the shaft 21 is non-rotatably connected with a second gear 22 whose teeth mesh with the teeth 23 formed on the first locking or arresting member having the form of a bolt 24 whose head or nose 24b is then moved away from the teeth 26a of a ratchet wheel 26 which is non-rotatably fixed to the holder 2 by a key 27. When the rack 8 is advanced by its plunger 6 to such an extent as to move the pallet 13a into actual abutment with the nearest tooth 14 of the ratchet wheel 15, the nose 24b already assumes its broken-line position 24b' (see FIG. 4); therefore, the holder 2 is unlocked for movements in one direction and may be rotated through 120 degrees during the subsequent portion of the stroke performed by the rack 8. Locking or arresting member 24 is formed with a bore 24c which receives a coiled expansion spring 24a. The rear end of resilient member 24a abuts against a threaded plug 28 which seals the bore of housing 1 in which the toothed member 24 is slidably mounted (see FIG. 1). Thus, the spring 24a constantly urges the nose 24b toward the ratchet wheel 26 and automatically moves the member 24 into locking position when the cam surface 8b is moved out of contact with the follower roller 16, i.e. as soon as the plunger 6 returns into the position of FIG. 3. During the return movement of rack 8 into the position of FIG. 3, the gear 9 is caused to rotate in opposing direction and entrains the pawl 13 whereby the pallet 13a rides over one of the teeth 14 and is arrested at the distance S therefrom, i.e. the forward and subsequent return strokes of rack 8 bring about oscillatory movements of pawl 13 through an angle corresponding to one third of a circle plus the distance S.

While the arresting member 24 safely locks the holder 2 against angular movements in one direction when the thread cutting tool T is in actual use, it cannot prevent rotation of the holder in the opposing angular direction. Such movements of the holder 2 are prevented by a second locking or arresting member in the form of a bolt 25, shown in FIGS. 1 and 5, whose nose or head 25b engages a selected tooth or shoulder 29a on a ratchet wheel 29 which is non-rotatably fixed to the holder 2 by a key 30. It will be readily noted by comparing FIGS. 4 and 5 that the teeth 26a and 29a are inverted or inclined in opposing directions, i.e. when the holder 2 is rotated by pawl 13 and the head 24b of toothed member 24 is withdrawn into the position 24b', the head 25b of the second locking bolt 25 merely rides over one of the teeth 29a, it being assumed that the holder 2 then rotates in clockwise direction (see FIG. 5). The locking bolt 25 is constantly urged into the position of FIG. 5 by a coiled expansion spring 25a which acts between a collar 25c on the member 25 and a threaded plug 31 which latter seals the bore in housing 1 in which the second bolt 25 is reciprocably mounted.

The operation of the assembly shown in FIGS. 1 to 5 is as follows:

When it is desired to move a selected one of knives or cutters 3a–3c into operative position, i.e. to turn the holder 2 through exactly 120 degrees, the piston 6 is caused to move from its idle position of FIG. 3 in a direction to the left whereby the cam surface 8b immediately engages the follower roller 16 and moves the toothed push rod 17 in the direction of arrow 18 to rotate the shaft 21 together with the gears 20, 22 thereon. The teeth or gear 22 mesh with the teeth 23 on the first locking bolt 24 and cause the latter's head 24b to move into the position 24b' against the action of resilient means 24a. The rack 8 simultaneously rotates the gear 9 and causes the pallet 13a to move into abutment with the nearest tooth 14 on the ratchet wheel 15 at a time when the head 24b of locking means 24 already assumes its broken-line position 24b'. The holder 2 is subsequently rotated through 120 degrees by gear 9 through the pawl 13 and ratchet wheel 15, and the head 25b of the second arresting bolt 25 merely rides over one of the teeth 29a on the ratchet wheel 29 against the action of resilient means 25a. The latter immediately returns the second arresting member 25 into locking position as soon as the holder 2 with the ratchet wheels 26, 29 is turned through 120 degrees. The head 24b of bolt 24 is automatically returned into its full-line locking position of FIGS. 1 and 4 as soon as the rack 8 is withdrawn by plunger 6 and the latter's rod 7 into the position of FIG. 3, i.e. as soon as the cam surface 8b moves away from actual contact with the follower roller 16, because the spring 24a is then free to displace the member 24 and to simultaneously impart angular motion to gears 20, 22 and to shaft 21, this being possible because the movement of toothed ram 17 into the position of FIG. 3 is not obstructed by the cam surface 8b or by the extension 8a of rack 8. The returning toothed rack 8 rotates the gear 9 in the opposite direction (i.e. anticlockwise in FIG. 3), and thus entrains the pallet 13a into its original position at a distance S from the nearest tooth 14.

It will be readily understood that the novel device is not limited to the use in cutting of threads on tubes and the like, but that it may be utilized wherever controlled rotation and retention of an angularly movable member is desired. Moreover, while the holder 2 has been shown connected to a tool T which is formed with three knives 3a–3c, it will be immediately apparent that the control mechanism may be utilized with insignificant modifications in connection with a two-, four-, five-, etc. knife cutting tool or the like merely by adjusting the stroke of the rack 8 and by changing the number of teeth or shoulders on the ratchet wheels 15, 26 and 29.

Without further analysis the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A device for intermittently rotating thread cutting tools and the like which comprises, in combination: a holder having an axis; a housing mounting the holder for rotation about said axis; means for intermittently rotating the holder comprising a cylinder and piston assembly, a toothed rack connected to and reciprocable by the piston of said assembly between two end positions, a gear meshing with the rack, rotatable relative to and coaxial with said holder, a pawl fixed to said gear, and a first ratchet wheel coaxially connected to said holder for transmitting rotation to the latter, the pawl being spaced from the nearest tooth of said ratchet wheel when the rack is in one of said end positions whereby the holder is rotated only during a portion of the stroke performed by the rack while the latter moves from said one into the other end position after the pawl is moved into engagement with the nearest tooth of said ratchet wheel; means for locking the holder against rotation by said ratchet wheel when the rack is in said one end position, said locking means comprising a second ratchet wheel fixed to said holder and a toothed bolt slidably mounted in said housing and constantly biased into engagement with said second ratchet wheel; and means for moving the bolt away from the second ratchet wheel comprising means movable with said rack and defining a cam surface, a toothed ram slidably mounted in said housing in the path of said cam surface whereby the ram is displaced while the rack moves from said one toward the other end position, a pinion meshing with and rotatable by the teeth of said ram, a shaft connected to said pinion, a second pinion fixed to said shaft and meshing with the teeth of said bolt for moving same away from the second ratchet wheel when the ram is displaced by said cam surface, the position of said cam surface being such that the bolt is moved away from the second ratchet wheel before the pawl engages the nearest tooth of said first mentioned ratchet wheel.

2. A device for intermittently rotating thread cutting tools and the like which comprises, in combination: a holder having an axis; a housing mounting the holder for rotation about said axis; means for intermittently rotating the holder comprising a cylinder and piston assembly, a toothed rack connected to and reciprocable by the piston of said assembly between two end positions, a gear meshing with the rack, rotatable relative to and coaxial with said holder, a pawl fixed to said gear, and a first ratchet wheel coaxially connected to said holder for transmitting rotation to the latter, the pawl being spaced from the nearest tooth of said ratchet wheel when the rack is in one of said end positions whereby the holder is rotated only during a portion of the stroke performed by the rack while the latter moves from said one into the other end position after the pawl is moved into engagement with the nearest tooth of said ratchet wheel; means for locking the holder against rotation by said ratchet wheel when the rack is in said one end position, said locking means comprising a second ratchet wheel fixed to said holder and a toothed bolt slidably mounted in said housing and constantly biased into engagement with said second ratchet wheel; means for moving the bolt away from the second ratchet wheel comprising means movable with said rack and defining a cam surface, a toothed ram slidably mounted in said housing in the path of said cam surface whereby the ram is displaced while the rack moves from said one toward the other end position, a pinion meshing with and rotatable by the teeth of said ram, a shaft connected to said pinion, a second pinion fixed to said shaft and meshing with the teeth of said bolt for moving same away from the second ratchet wheel when the ram is displaced by said cam surface, the position of said cam surface being such that the bolt is moved away from the second ratchet wheel before the pawl engages the nearest tooth of said first mentioned ratchet wheel; and means for locking said holder against rotation in the direction opposed to that in which the holder is rotated by said first ratchet wheel, said last mentioned locking means comprising a third ratchet wheel fixed to said holder and having teeth inclined in a direction opposed to that of the teeth on said second ratchet wheel, and a second bolt slidably mounted in said housing and constantly biased into engagement with said third ratchet wheel.

3. A device for intermittently rotating thread cutting tools and the like which comprises, in combination: a holder having an axis; a housing mounting the holder for rotation about said axis; means for intermittently rotating the holder comprising a cylinder and piston assembly, a toothed rack connected to and reciprocable by the piston of said assembly between two end positions, a gear meshing with the rack, rotatable relative to and coaxial with said holder, a pawl fixed to said gear, a first ratchet wheel coaxially connected to said holder for transmitting rotation to the latter, and resilient means for constantly biasing the pawl toward said ratchet wheel, the pawl being spaced from the nearest tooth of said ratchet wheel when the rack is in one of said end positions whereby the holder is rotated only during a portion of the stroke performed by the rack while the latter moves from said one into the other end position after the pawl is moved into engagement with the nearest tooth of said ratchet wheel; means for locking the holder against rotation by said ratchet wheel when the rack is in said one end position, said locking means comprising a second ratchet wheel fixed to said holder and a toothed bolt slidably mounted in said housing and constantly biased into engagement with said second ratchet wheel; and means for moving the bolt away from the second ratchet wheel comprising means movable with said rack and defining a cam surface, a toothed ram slidably mounted in said housing in the path of said cam surface whereby the ram is displaced while the rack moves from said one toward the other end position, a pinion meshing with and rotatable by the teeth of said ram, a shaft connected to said pinion, a second pinion fixed to said shaft and meshing with the teeth of said bolt for moving same away from the second ratchet wheel when the ram is displaced by said cam surface, the position of said cam surface being such that the bolt is moved away from the second ratchet wheel before the pawl engages the nearest tooth of said first mentioned ratchet wheel.

4. A device for intermittently rotating thread cutting tools and the like which comprises, in combination: a holder having an axis; a housing mounting the holder for rotation about said axis; means for intermittently rotating the holder comprising a cylinder and piston assembly, a toothed rack connected to and reciprocable by the piston of said assembly between two end positions, a gear meshing with the rack, rotatable relative to and coaxial with said holder, a pawl fixed to said gear, and a first ratchet wheel coaxially connected to said holder for transmitting rotation to the latter, the pawl being spaced from the nearest tooth of said rachet wheel when the rack is in one of said end positions whereby the holder is rotated only during a portion of the stroke performed by the rack while the latter moves from said one into the other end position after the pawl is moved into engagement with the nearest tooth of said ratchet wheel; means for locking the holder against rotation by said ratchet wheel when the rack is in said one end position, said locking means comprising a second ratchet wheel fixed to said holder and a toothed bolt slidably mounted in said housing and constantly biased into engagement with said second ratchet wheel; and means for moving the bolt away from the second ratchet wheel comprising an extension fixed to said rack and defining a cam surface, a toothed ram slidably mounted in said housing, a follower roller rotatably fixed to said ram in the path of said cam surface whereby the ram is displaced while the rack moves from said one toward the other end position and the cam surface engages said roller, a pinion meshing with and rotatable by the teeth of said ram, a shaft connected to said pinion, a second pinion fixed to said shaft and meshing with the teeth of said bolt for moving same away from the second ratchet wheel when the ram is displaced by said cam surface, the position of said cam surface being such that the bolt is moved away from the second ratchet wheel before the pawl engages the nearest tooth of said first mentioned ratchet wheel.

5. A device for intermittently rotating thread cutting tools and the like which comprises, in combination: a holder having an axis; a housing mounting the holder for rotation about said axis; means for intermittently rotating the holder comprising a cylinder and piston assembly, a toothed rack connected to and reciprocable by the piston of said assembly between two end positions, a gear meshing with the rack, rotatable relative to and coaxial with said holder, a pawl fixed to said gear, and a first ratchet wheel coaxially connected to said holder for transmitting rotation to the latter, the pawl being spaced from the nearest tooth of said ratchet wheel when the rack is in one of said end positions whereby the holder is rotated only during a portion of the stroke performed by the rack while the latter moves from said one into the other end position after the pawl is moved into engagement with the nearest tooth of said ratchet wheel; means for locking the holder against rotation by said ratchet wheel when the rack is in said one end position, said locking means comprising a second ratchet wheel fixed to said holder and a toothed bolt slidably mounted in said housing and constantly biased into engagement with said second ratchet wheel; and means for moving the bolt away from the second ratchet wheel comprising means movable with said rack and defining a cam surface, a toothed ram mounted in said housing for sliding movements in a direction at right angles to the axis of said holder and located in the path of said cam surface when the rack is advanced from said one toward the other end position, a pinion meshing with and rotatable by the teeth of said ram, a shaft connected to said pinion, a second pinion fixed to said shaft and meshing with the teeth of said bolt for moving the same away from the second ratchet wheel when the ram is displaced by said cam surface, the position of said cam surface being such that the bolt is moved away from the second ratchet wheel before the pawl engages the nearest tooth of said first mentioned ratchet wheel.

6. In a thread cutting device, in combination: a housing; a holder having an axis and mounted in the housing for rotation about said axis; a thread cutting tool fixed to said holder and comprising a plurality of cutters disposed in a plane at right angles to the axis of said holder; means for intermittently rotating the holder whereby to move a selected cutter into a given position, said rotating means comprising a cylinder, a double acting piston reciprocable in the cylinder, a toothed rack rigidly fixed to the piston and linearly movable thereby at right angles to the axis of said holder between two end positions, a gear having teeth constantly meshing with the teeth of said rack, said gear being coaxial with and rotatable relative to said holder, a pawl pivotably fixed to said gear, and a ratchet wheel coaxially fixed to the holder and having spaced teeth in the path of said pawl when the latter is rotated with said gear while the rack is moved from the one into the other end position, said pawl being spaced from the nearest tooth of the ratchet wheel when the rack is in said one end position whereby the rotation of the ratchet wheel and of the holder begins only after the rack completes a portion of its movements from said one into the other end position; first locking means for retaining the holder against rotation by said ratchet wheel comprising a second ratchet wheel fixed to said holder, a locking bolt constantly biased into engagement with the second ratchet wheel, and a connection between said rack and said locking bolt for moving the latter away from the second ratchet wheel when the rack begins its movement from said one into the other end position, the bolt being disengaged from the second ratchet wheel before the pawl begins to rotate said first mentioned ratchet wheel; and second locking means arranged to hold the first ratchet wheel against rotation in a direction counter to that effected by said rack.

References Cited in the file of this patent

UNITED STATES PATENTS

| | | |
|---|---|---|
| 1,128,034 | Oster | Feb. 9, 1915 |
| 1,964,351 | Haas | June 26, 1934 |
| 2,370,218 | Young | Feb. 27, 1945 |
| 2,388,799 | Boehmler | Nov. 13, 1945 |
| 2,660,737 | Escure | Dec. 1, 1953 |
| 2,768,393 | Sayce | Oct. 30, 1956 |
| 2,778,037 | Renoux | Jan. 22, 1957 |
| 2,871,732 | Olson | Feb. 3, 1959 |

FOREIGN PATENTS

| | | |
|---|---|---|
| 556,562 | Germany | Aug. 10, 1932 |